3,477,631
COMBINATION PALLET AND CONTAINER
Charles K. Dunlap, Jr., and Walter E. Johnson, Hartsville, and William M. Harper, Darlington, S.C., asisgnors to Sonoco Products Company, Hartsville, S.C., a corporation of South Carolina
Filed Aug. 16, 1968, Ser. No. 753,252
Int. Cl. B65d 3/10, 19/44, 7/42
U.S. Cl. 229—14                               6 Claims

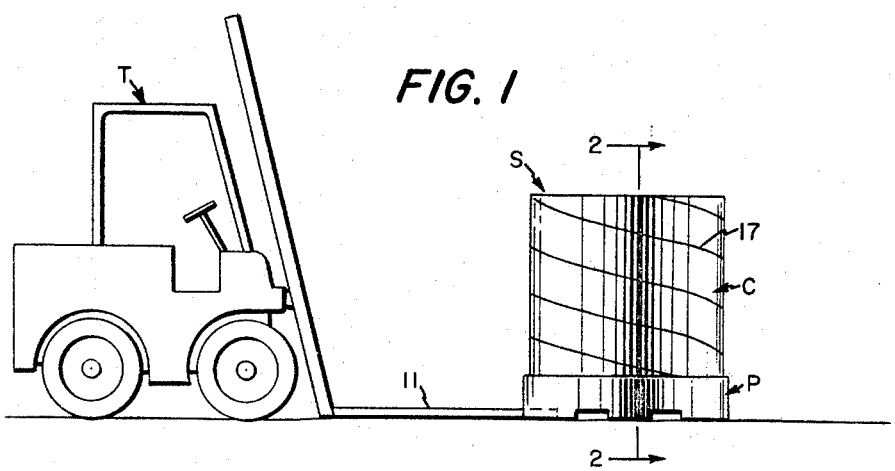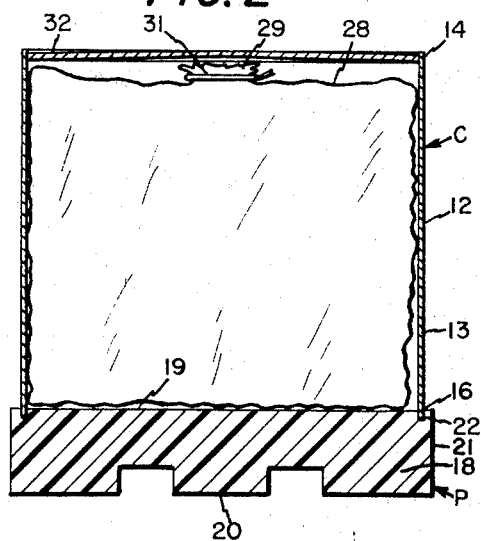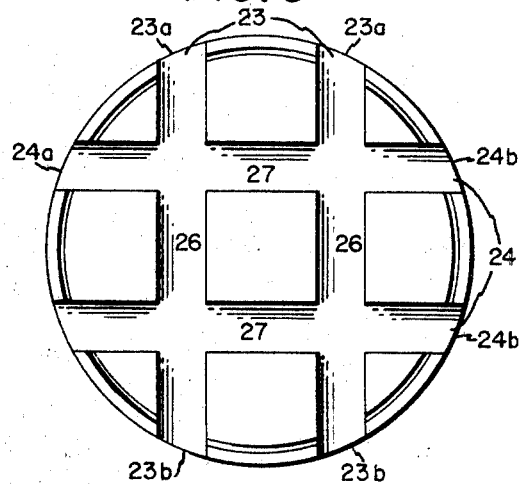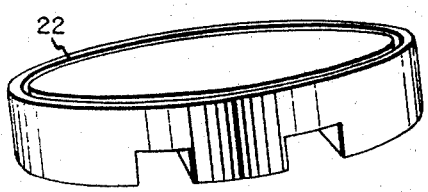
INVENTORS
CHARLES K. DUNLAP JR.
WALTER E. JOHNSON
WILLIAM M. HARPER
BY Russell Foster
ATTORNEY

United States Patent Office 3,477,631
Patented Nov. 11, 1969

ABSTRACT OF THE DISCLOSURE

A tubular body having one end secured in sealing relationship to the top surface of a base member of rigid expanded plastic foam material to form a container with the bottom surface of the base member being provided with at least one pair of channels for receiving a pair of lifting forks of an associated lift truck.

---

This invention relates to containers and more particularly to a container having a pallet combined therewith.

As is well known, a common practice for the movement of large loads such as relatively large containers and the like is to utilize a pallet on which the load is placed. Such pallets are commonly provided with access openings for the lifting forks of a lift truck so that by insertion of the forks into the pallet openings the load may be transported from one location to another. Such pallets are generally constructed of wood or the like and are not only relatively high in initial cost but deteriorate rapidly due to the destructive effects of the truck forks so as to reduce the useful life of such pallets. Furthermore, additional operations are required to position a load on such pallets and there is the added inconvenience and expense imposed by the requirement of having such pallets readily accessible for use. As far as containers are concerned, relatively large containers such as drums and the like must not only be ruggedly constructed to withstand the rugged use to which such containers are subjected but where liquids are to be packaged in such containers, a suitable leakproof construction must be provided for the container adding further to the container cost.

Accordingly, a primary object of this invention is to provide a new and novel combination pallet and container.

Another object of this invention is to provide a new and novel combination pallet and container in which the pallet may be molded in a one-piece form from inexpensive plastic foam material.

A further object of this invention is to provide a new and novel combination pallet and container in which the pallet is incorporated as a component part of the container thereby reducing the container cost.

Still another object of this invention is to provide a new and novel combination pallet and container formed as a unitary structure and which may be employed to contain liquids in relatively large quantities without risk of leaking.

This invention further contemplates the provision of a new and novel combination pallet and container which is simple and rugged in construction, which is low in initial cost so as to economically permit a one-time use, which is adapted to be used with an inexpensive plastic bag for containing liquids in a leakproof manner and which eliminates the cost of maintaining a stockpile of readily available pallets.

Other objects and advantages of the invention will become apparent from the following description taken in connection with the accompanying drawing.

The objects of this invention and other related objects are accomplished by providing a tubular body having a side wall and upper and lower ends which are open. A base member of rigid expanded plastic foam material having a top surface, a bottom surface and a continuous side surface is provided and means are provided for securing the lower edge portion of the lower end of the tubular body to the top surface of the base member in sealing relationship therewith so that the tubular body side wall and base member top surface form a container. The bottom surface of the base member is provided with at least one pair of transversely extending channels arranged in substantially parallel, spaced apart relationship, the channels having a bottom wall and ends opening into the base member side surface for receiving a pair of lifting forks of an associated lift truck.

The novel features which are believed to be characteristic of the invention are set forth with particularity in the appended claims. The invention itself, however, both as to its organization and method of operation may be best understood by reference to the following description taken in conjunction with the accompanying drawing in which:

FIGURE 1 is a side view of the invention in association with a lift truck;

FIGURE 2 is an enlarged sectional view taken substantially along line 2—2 of FIGURE 1;

FIGURE 3 is a plan view of the invention as viewed from the bottom; and

FIGURE 4 is a perspective view of the pallet incorporated in the invention.

Referring now to the drawing and to FIGURE 1 in particular, there is shown a combination pallet and container constructed in accordance with the invention and designated generally by the letter S. As will be explained hereinafter, the combination pallet and container S is arranged to be transported by a pair of lifting forks 11 incorporated in the well-known manner with a lift truck T of conventional construction. As is well known, the forks 11 are arranged in parallel, spaced apart relationship and suitable hoisting apparatus (not shown) is incorporated within the lift truck T for elevating and depressing the forks 11 for the transporting of loads.

The invention comprises the combination of a container designated generally by the letter C and a pallet designated generally by the letter P. The combination pallet and container S includes a tubular body 12 having a side wall 13 and upper and lower ends 14, 16 respectively. The tubular body 12 may be formed of any suitable material and in the specific embodiment illustrated, the body 12 is formed of a multi-ply, wound paper tube which is preferably spirally wound from fibrous material such as paper as indicated by the outer spiral seam 17 shown in FIGURE 1. It should be understood that although the combination pallet and container S of the invention may be of any desired size and for accommodating any desired material, the invention is particularly suitable for relatively large loads which may include liquid, semi-liquid, granular material or the like.

The pallet P forms a unitary structure with the container C and includes a base 18 as shown in FIGURES 2–4. The base member 18 is formed of rigid, expanded, plastic foam material molded in a one-piece construction by any conventional molding operation. Preferably the material of the base member 18 is polystyrene or the like. The base member 18 is provided with a top surface 19, a bottom surface 20, and a continuous side surface 21 and is preferably of cylindrical shape as shown.

Means are provided for securing the lower edge portion of the lower end 16 of the tubular body 12 to the top surface 19 of the base member 18 in sealing relationship therewith and with the tubular body side wall 13 in inwardly spaced relationship from the base member side surface 21 as shown best in FIGURE 2. More specifically, an annular recess or groove 22 is provided in the top surface 19 of the base member 18 which receives the lower edge portion of the tubular body lower end 16 in snug-fitting relationship so that the tubular body 12 is positioned in co-axial relationship with the base member 18 and with the top surface 19 forming the bottom of the container C. The tubular body lower edge portion adjacent the lower end 16 is preferably adhesively secured within the annular groove 22 so that a sealing relationship is obtained.

At least one pair of transversely extending channels are provided in the bottom surface 20 of the base member 18 which are arranged in substantially parallel, spaced apart relationship. In the preferred embodiment, two pairs 23, 24 of such channels are provided which are arranged in right angle intersecting relationship as shown best in FIGURE 3. The pairs 23, 24 of channels are provided with bottom walls 26, 27 respectively and have ends 23a, 23b and 24a, 24b opening into the base member side surface 21 for receiving the pair of lifting forks 11 of the truck T.

It can be seen by providing two pairs 23, 24 of such channels that four points of entrance are provided for the forks 11 uniformly spaced around the base member 18 thereby facilitating the positioning of the forks within the channels regardless of the position of the combination pallet and container S of the invention.

In order to accommodate liquids within the container C, a bag 28 of flexible leakproof material, which may be a suitable plastic material such as polyethylene or the like, is positioned within the container C as shown in FIGURE 2, the capacity of the bag 28 being generally that of the container C. The bag 28 is provided with a fill opening 29 which may be suitably closed when the bag is filled by gathering and tying the material adjacent the bag opening 29 with a suitable tie string 31 or the like as shown in FIGURE 2.

The upper end 14 of the tubular body 12 is preferably closed with a suitable closure 32 which may be formed of foam plastic material similar to the material of the base member 18 and which is removably positioned in snug-fitting relationship with the tubular body 12 as shown in FIGURE 2. In the illustrated embodiment, it is not contemplated that the container C will be tilted when utilizing the liquid containing bag 28 so that the closure 32 may function solely to prevent the entry of foreign matter rather than retain the liquid in container C since this is accomplished by the closed bag 28.

In the filled condition of the bag 28, the contents of which may be a liquid or the like, and with the bag opening 29 closed with tie string 31 and the closure 32 in the position shown, the combination pallet and container S of the invention is ready for movement between locations, loading or unloading on a shipping conveyance in the upstanding position of FIGURE 1, etc. The forks 11 of the truck T are moved into a selected pair 23, 24 of channels as shown in FIGURE 1 so that they extend throughout the major portion if not all of the length of the channels. The lifting forks 11 may then be raised to elevate the combination pallet and container S and move it to the desired location. In the embodiment shown, any substantial tilting of the combination pallet and container is avoided but any such tilting would not normally occur since such loads are generally always moved in an upright position.

It can be seen that there has been provided with this invention an extremely low cost and expendable combination pallet and container composed of a minimum of component parts, which may be easily formed and assembled and which is extremely rugged in construction so as to resist the destructive effects forces encountered during use. An outstanding feature of the invention is the ability of the combination pallet and container to contain extremely heavy loads in relationship to its weight and at the same time providing a leakproof construction without the use of expensive container constructions in common use today. An outstanding result of the invention is the elimination of the need for separate pallets and the time-consuming operation of positioning and removing loads on such pallets.

While there has been described what at present is considered to be the preferred embodiment of the invention, it will be understood by those skilled in the art that various changes and modifications may be made therein without departing from the invention.

Having thus described the invention, what is claimed is:

1. A combination pallet and container comprising, in combination, a tubular body having a side wall and upper and lower open ends, a base member of rigid, expanded plastic foam material having a top surface, a bottom surface, and a continuous side surface, means for securing the lower edge portion of said tubular body to said base member top surface in sealing relationship therewith with said tubular body side wall in inwardly spaced relationship with said base member side surface, said tubular body side wall and said base member top surface forming a container having an open upper end, said base member bottom surface having at least one pair of transversely extending channels therein arranged in substantially parallel, spaced apart relationship, said channels having a bottom wall and terminal ends opening into said base member side surface for receiving said pair of lifting forks.

2. A combination pallet and container in accordance with claim 1 wherein said base member is of cylindrical shape and wherein said tubular body is positioned on said base member in co-axial relationship therewith.

3. A combination pallet and container in accordance with claim 1 wherein two pairs of transversely extending channels are provided in said base member, said pairs of channels being disposed in right angle intersecting relationship.

4. A combination pallet and container in accordance with claim 1 wherein said securing means include an annular groove in said base member top surface for receiving said tubular body lower edge portion in snug-fitting relationship therewith and wherein said tubular body lower edge portion is adhesively secured within said groove.

5. A combination pallet and container in accordance with claim 4 including a bag of flexible leakproof material removably positioned within said tubular body, said bag having an open end adjacent the upper open end of said tubular body.

6. A combination pallet and container in accordance with claim 5 wherein said tubular body comprises a multiply wound paper tube and including a closure removably positioned in closing relationship within said tubular body upper end.

References Cited

UNITED STATES PATENTS

| 2,628,840 | 2/1953 | Laube | 220—69 X |
| 2,664,219 | 12/1953 | Schmidt | 220—69 X |
| 2,872,079 | 2/1959 | Moore | 220—69 X |

FOREIGN PATENTS

| 667,431 | 7/1963 | Canada. |

JOSEPH R. LECLAIR, Primary Examiner

J. R. GARRETT, Assistant Examiner

U.S. Cl. X.R.

108—55; 220—67, 70; 229—5.5